(12) United States Patent
Kim et al.

(10) Patent No.: US 10,470,175 B2
(45) Date of Patent: Nov. 5, 2019

(54) MESH NETWORK CONFIGURATION IN A WHITE SPACE BAND

(75) Inventors: Eunsun Kim, Anyang-si (KR); Yongho Seok, Anyang-si (KR)

(73) Assignee: LG Electronics Inc., Seoul (KR)

(*) Notice: Subject to any disclaimer, the term of this patent is extended or adjusted under 35 U.S.C. 154(b) by 250 days.

(21) Appl. No.: 14/001,703

(22) PCT Filed: Dec. 8, 2011

(86) PCT No.: PCT/KR2011/009463
§ 371 (c)(1),
(2), (4) Date: Aug. 27, 2013

(87) PCT Pub. No.: WO2012/115338
PCT Pub. Date: Aug. 30, 2012

(65) Prior Publication Data
US 2013/0336277 A1     Dec. 19, 2013

Related U.S. Application Data

(60) Provisional application No. 61/447,080, filed on Feb. 27, 2011.

(51) Int. Cl.
*H04W 72/04* (2009.01)
*G01S 5/02* (2010.01)
(Continued)

(52) U.S. Cl.
CPC ....... *H04W 72/0426* (2013.01); *G01S 5/0289* (2013.01); *H04W 24/02* (2013.01);
(Continued)

(58) Field of Classification Search
None
See application file for complete search history.

(56) References Cited

U.S. PATENT DOCUMENTS

| 8,644,851 B2 * | 2/2014 | Bajko ............... H04W 72/0453 |
| | | 455/456.1 |
| 2006/0268922 A1 * | 11/2006 | Lee ....................... H04W 72/04 |
| | | 370/437 |

(Continued)

FOREIGN PATENT DOCUMENTS

| KR | 10-2006-0107415 A | | 10/2006 | |
| WO | WO 2011/047694 | * | 10/2009 | ............ H04W 72/02 |
| WO | WO 2011/047694 A1 | * | 10/2009 | ............ H04W 72/02 |

OTHER PUBLICATIONS

Written Opinion and International Search Report issued in corresponding International Patent Application No. PCT/KR2011/009463 dated Jul. 30, 2012.

*Primary Examiner* — Jeffrey M Rutkowski
*Assistant Examiner* — Ning Li
(74) *Attorney, Agent, or Firm* — Morgan, Lewis & Bockius LLP

(57) ABSTRACT

The invention relates to a method for efficiently configuring a mesh network in a white space band and to a device therefor. In order to configure a mesh network in a white space band, a first station, which is accessible to a geographical position database through direct Internet access, notifies at least one second station through a gate announcement frame, for which the first station itself serves as a mesh gate; at least one second station receives a first multi-hop management action frame including position information on each of at least one, mesh point that subscribes to a mesh network; and a second multi-hop management action frame including information on an available channel in the white space is transmitted to at least one mesh point. Therefore, a mesh network may be configured in a white space band.

5 Claims, 8 Drawing Sheets

| CATEGORY | MESH ACTION | MESH CONTROL | INDIVIDUAL WSM | MBSS WSM |
|---|---|---|---|---|
| OCTETS: 1 | 1 | VARIABLE | VARIABLE | VARIABLE |

(51) Int. Cl.
   *H04W 24/02* (2009.01)
   *H04W 84/12* (2009.01)
   *H04W 48/08* (2009.01)
   *H04W 64/00* (2009.01)

(52) U.S. Cl.
   CPC ............ *H04W 48/08* (2013.01); *H04W 64/00* (2013.01); *H04W 84/12* (2013.01)

(56) References Cited

U.S. PATENT DOCUMENTS

| | | | |
|---|---|---|---|
| 2007/0197245 A1* | 8/2007 | Tsubota | H04W 72/02 455/509 |
| 2008/0013514 A1* | 1/2008 | Lee | H04W 74/0808 370/338 |
| 2008/0233946 A1 | 9/2008 | Henry | |
| 2008/0240024 A1 | 10/2008 | Rao et al. | |
| 2009/0088182 A1* | 4/2009 | Piersol et al. | 455/456.1 |
| 2009/0116430 A1 | 5/2009 | Bonta et al. | |
| 2009/0175238 A1* | 7/2009 | Jetcheva | H04W 72/085 370/329 |
| 2009/0268674 A1 | 10/2009 | Liu et al. | |
| 2009/0290518 A1* | 11/2009 | Gossain et al. | 370/310 |
| 2010/0173586 A1* | 7/2010 | McHenry | H04L 27/0006 455/62 |
| 2010/0238798 A1* | 9/2010 | Ahuja | H04L 41/0681 370/225 |
| 2011/0110349 A1* | 5/2011 | Grandhi | H04W 28/18 370/338 |
| 2011/0116458 A1* | 5/2011 | Hsu et al. | 370/329 |
| 2011/0143761 A1* | 6/2011 | Uusitalo | H04W 72/02 455/450 |
| 2011/0158127 A1* | 6/2011 | Duo | H04W 48/16 370/254 |
| 2011/0280228 A1* | 11/2011 | McCann et al. | 370/338 |
| 2012/0008604 A1* | 1/2012 | Kasslin et al. | 370/338 |

* cited by examiner

FIG. 3

| CATEGORY | MESH ACTION | GANN INFORMATION ELEMENT |
|---|---|---|
| 1 | 1 | 6 |

OCTETS:

FIG. 4

| ELEMENT ID | LENGTH | FLAGS | HOP COUNT | ELEMENT TTL | MESH GATE ADDRESS | GANN SEQUENCE NUMBER | INTERVAL |
|---|---|---|---|---|---|---|---|
| 1 | 1 | 1 | 1 | 2 | 6 | 4 | 2 |

OCTETS:

FIG. 6

| CATEGORY | MESH ACTION | MESH CONTROL | FCC IDENTIFIER | SERIAL NUMBER | LCI |
|---|---|---|---|---|---|
| 1 | 1 | VARIABLE | VARIABLE | VARIABLE | VARIABLE |

OCTETS:

FIG. 7

| CATEGORY | MESH ACTION | MESH CONTROL | WHITE SPACE MAP |
|---|---|---|---|
| 1 | 1 | VARIABLE | VARIABLE |

OCTETS:

FIG. 8

| CATEGORY | MESH ACTION | MESH CONTROL | INDIVIDUAL WSM | MBSS WSM |
|---|---|---|---|---|
| 1 | 1 | VARIABLE | VARIABLE | VARIABLE |

OCTETS:

MESH NETWORK CONFIGURATION IN A WHITE SPACE BAND

This is a U.S. National Phase Entry of PCT Application No. PCT/KR2011/009463 filed Dec. 8, 2011, and claims the benefit of US Provisional Application No. 61/447,080 filed Feb. 27, 2011.

TECHNICAL FIELD

The disclosure relates to a wireless local area network (WLAN) system and, more particularly, to a method of efficiently configuring a mesh network in a white space band and an apparatus for the same.

BACKGROUND ART

Standards for WLAN technologies have been developed as Institute of Electrical and Electronics Engineers (IEEE) 802.11 standards. IEEE 802.11a and 802.11b use an unlicensed band at 2.4 GHz or 5 GHz. IEEE 802.11b provides a transfer rate of 11 Mbps and IEEE 802.11a provides a transfer rate of 54 Mbps. IEEE 802.11g provides a transfer rate of 54 Mbps using Orthogonal frequency division multiplexing (OFDM) at 2.4 GHz. IEEE 802.11n provides a transfer rate of 300 Mbps for 4 spatial streams using multiple input multiple output-OFDM (MIMO-OFDM). IEEE 802.11n supports a channel bandwidth of up to 40 MHz and, in this case, provides a transfer rate of 600 Mbps.

An IEEE 802.11af standard for defining operations of unlicensed devices in a TV white space (TVWS) band is currently under development. In order for an unlicensed device to operate in a white space band, it is required to acquire information regarding available channels which are not used by a licensed device.

Hereinafter, a Mesh Network will be described.

FIG. 1 is a view illustrating a concept of a mesh network.

The mesh network means a network in which each node transmits and receives data thereof and, in addition, relays data for the other nodes. That is, in the mesh network, nodes may cooperate for data transmission in the network.

As shown in FIG. 1, the mesh network may include a plurality of Mesh Points (MPs). That is, the MPs constitute a multi-hop wireless network.

An MP providing an infrastructure BSS may be referred to a Mesh Access Point (MAP). In the following description, it is assumed that the MAP is included in the MPs.

DISCLOSURE

Technical Problem

Concrete research into a technology for configuring a mesh network as described above in a white space band is needed.

In particular, regulations, such as conditions required for Mesh Points to configure a mesh network in a white space band and procedures for the Mesh Points acquiring available channel information, are required.

Technical Solution

In accordance with an aspect of the present invention, the above object may be accomplished by the provision of a method of configuring a Mesh Network in a white space band including informing one or more second stations that a first station capable of accessing a geo-location database through direct Internet access is capable of operating as a Mesh Gate through a Gate Announcement Frame, receiving from one or more Mesh Points which intends to join the Mesh Network, among the one or more second stations, a first Multi-Hop Management Action Frame including location information of each of the one or more Mesh Points, and transmitting a second Multi-Hop Management Action Frame including available channel information in the white space band to the one or more Mesh Points.

In accordance with another aspect of the present invention, there is provided a method of configuring a Mesh Network in a white space band including a second station receiving from a first station capable of accessing a geo-location database through direct Internet access a Gate Announcement Frame indicating that the first station is capable of operating as a Mesh Gate, transmitting a first Multi-Hop Management Action Frame including location information of the second station to the first station when the second station intends to join the Mesh Network as a Mesh Point, and receiving a second Multi-Hop Management Action Frame including available channel information in the white space band from the first station.

In the above embodiments, the Mesh Point may include a fixed device or a mode II device.

The Gate Announcement Frame may include a frame enabling a field indicating that the first station has a geo-location database access capability.

The first Multi-Hop Management Action Frame may include a mesh control field including address information of the Mesh Gate, an FCC identifier field including an FCC identifier of the Mesh Point, a serial number field indicating a Serial Number allocated to a manufacturer of the Mesh Point, and a location configuration information field indicating location information of the Mesh Point.

The second Multi-Hop Management Action Frame may include a mesh control field indicating an address of the Mesh Gate having transmitted the first Multi-Hop Management Action Frame and a White Space Map field indicating the available channel information.

The White Space Map may indicate available channel information commonly applicable to Mesh Points of the Mesh Network.

In accordance with another aspect of the present invention, the above object may be accomplished by the provision of a station apparatus operating to configure a Mesh Network in a white space band including a direct Internet access module for accessing a geo-location database and a wireless communication module for informing one or more second stations that a first station capable of accessing a geo-location database through direct Internet access is capable of operating as a Mesh Gate through a Gate Announcement Frame, receiving from one or more Mesh Points which intends to join the Mesh Network, among the one or more second stations, a first Multi-Hop Management Action Frame including location information of each of the one or more Mesh Points, and transmitting a second Multi-Hop Management Action Frame including available channel information in the white space band to the one or more Mesh Points.

In accordance with a further aspect of the present invention, there is provided a station apparatus for configuring a Mesh Network in a white space band including a wireless communication module and a processor connected to the wireless communication module, wherein the wireless communication module receives from a first station capable of accessing a geo-location database through direct Internet access a Gate Announcement Frame indicating that the first station is capable of operating as a Mesh Gate, transmits a first Multi-Hop Management Action Frame including location information of the second station to the first station when the processor determines that the second station intends to join the Mesh Network as a Mesh Point, and receives a second Multi-Hop Management Action Frame including available channel information in the white space band from the first station.

In the above embodiments, the Mesh Point may include a fixed device or a mode II device.

The Gate Announcement Frame may include a frame enabling a field indicating that the first station has a geo-location database access capability.

The first Multi-Hop Management Action Frame may include a mesh control field including address information of the Mesh Gate, an FCC identifier field including an FCC identifier of the Mesh Point, a serial number field indicating a Serial Number allocated to a manufacturer of the Mesh Point, and a location configuration information field indicating location information of the Mesh Point.

The second Multi-Hop Management Action Frame may include a mesh control field indicating an address of the Mesh Gate having transmitted the first Multi-Hop Management Action Frame and a White Space Map field indicating the available channel information.

The White Space Map may indicate available channel information commonly applicable to Mesh Points of the Mesh Network.

Advantageous Effects

According to the embodiments of the present invention as described above, it is possible to efficiently configure a mesh network in a white space band.

DESCRIPTION OF DRAWINGS

FIG. 3 is a view showing an example of a format of a gate announcement frame according to an embodiment of the present invention.

FIG. 4 is a view showing an example of a format of a GANN information element of the gate announcement frame format of FIG. 4.

FIG. 6 is a view showing an example of a format of a multi-hop management action frame for a channel availability query request according to an embodiment of the present invention.

FIG. 7 is a view showing an example of a format of a multi-hop management action frame for a channel availability query response according to an embodiment of the present invention.

FIG. 8 is a view showing an example of a format of a multi-hop management action frame for a channel availability query response having a plurality of white space maps (WSMs) according to an embodiment of the present invention.

BEST MODE

Figure 1:
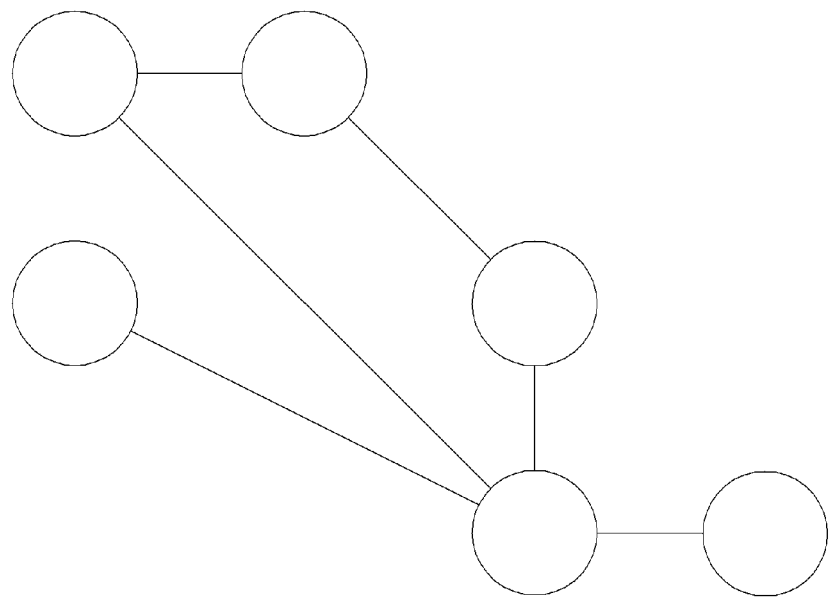
FIG. 1 is a view illustrating a concept of a mesh network.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

As described above, a channel availability query procedure for configuring a mesh network in a white space band (for example, a TV White Space) will hereinafter be described. First, characteristics of a white space band in an IEEE 802.11af system will be described. Hereinafter, a white space band operation will be described centering on a TV White Space. However, the white space band is not limited to such a TV White Space band.

Devices operating in the TV White Space may be classified into a Fixed Device, a Personal/Portable Mode I device, and a Personal/Portable Mode II device.

The Fixed device is a fixed terminal, the location of which must be registered in a geo-location database. The Fixed device may access the geo-location database to acquire an available channel list. In addition, this type device operates in the corresponding available channel list. When a channel which is being used by the Fixed device is no longer available, the Fixed device interrupts the use of the channel.

The Personal/Portable Mode II device (or Mode II device) is a personal portable terminal, the location of which is not registered in the geo-location database. However, the Personal/Portable Mode II device may access the geo-location database to acquire an available channel list at the location thereof. This type device operates in the corresponding available channel list. When a channel which is being used by the Personal/Portable Mode II device is not available any longer, the Personal/Portable Mode II device interrupts the use of the channel. As compared with the Fixed device, transmission output power of the Personal/Portable Mode II device is restricted.

The Personal/Portable Mode I device (or Mode I device) is controlled by the Fixed device and the Personal/Portable Mode II device. In the same manner as in the Personal/Portable Mode II device, the location of the Personal/Portable Mode I device is not registered in the geo-location database. After validity of a device ID of the Personal/Portable Mode I device is confirmed through the geo-location database, however, the use of the Personal/Portable Mode I device is allowed. In addition, the Personal/Portable Mode I device must receive an available channel list from the Personal/Portable Mode II device and periodically confirm that the available channel list is not changed.

In the following description, it is assumed that, in order for mesh points (MPs) operating in a white space (for example, a TV White Space) to constitute a multi-hop wireless network, the corresponding MPs are Fixed devices or Personal/Portable Mode II device. This is because the Personal/Portable Mode I device cannot perform network initiation and thus cannot participate in the multi-hop wireless network.

In one embodiment of the present invention, in order for the MPs to operate as the Fixed devices and the Personal/Portable Mode II devices, the MPs must acquire an available channel list from the geo-location database. To this end, the MPs joining the Mesh Network may use a multi-hop management action frame to acquire the available channel list.

Specifically, a station that can access the geo-location database through direct Internet Access may inform the other MPs of a geo-location database access capability thereof through a Gate Announcement frame as a Mesh Gate. That is, in this embodiment, an MP having an Internet access backbone, among the MPs constituting the mesh network, may perform a core function in forming the mesh network as the Mesh Gate.

Figure 2:
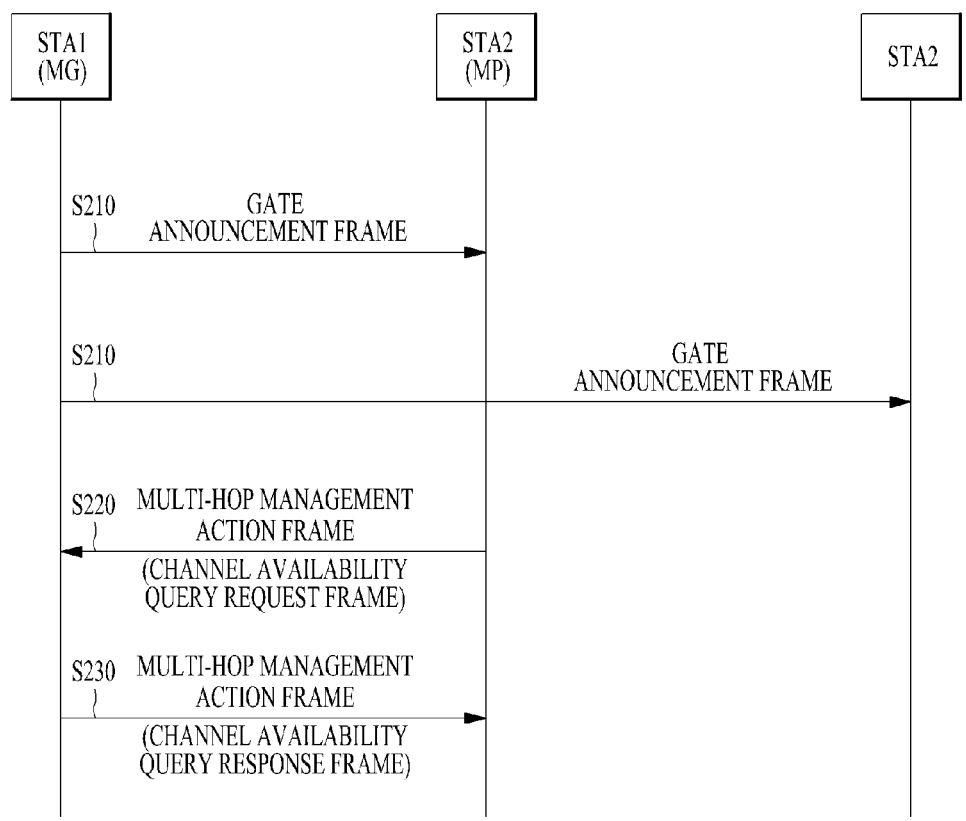
FIG. 2 is a view schematically illustrating a method of configuring a mesh network in a white space band according to an embodiment of the present invention.

FIG. 2 is a view schematically illustrating a method of configuring a mesh network in a white space band according to an embodiment of the present invention.

As described above, a first station (STA1) having a geo-location database access capability may function as a Mesh Gate (MG). The mesh gate may inform a plurality of stations (STA2) of the geo-location database access capability thereof through a gate announcement frame in order to configure the mesh network (S210).

FIG. 3 is a view showing an example of a format of a Gate Announcement frame according to an embodiment of the present invention and FIG. 4 is a view showing an example of a format of a GANN information element of the Gate Announcement frame format of FIG. 4.

The Gate Announcement frame is information broadcasted to the Mesh Network and serves to inform of the presence of a Mesh Gate and an address (for example, a MAC address) of the Mesh Gate. In this embodiment, in order to inform that the Mesh Gate provides a geo-location database access function, a flag field of the GANN information element may be set as shown in FIG. 5.

Figure 5:
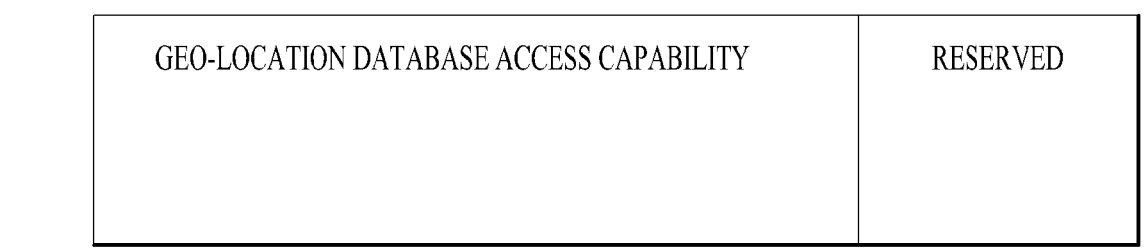
FIG. 5 is a view showing a flag field of a GANN information element according to an embodiment of the present invention.

FIG. 5 is a view showing a flag field of a GANN information element according to an embodiment of the present invention.

As shown in FIG. 5, a GANN information element of a Gate Announcement frame according to an embodiment of the present invention includes a 1 bit field indicating whether a station has a geo-location database access capability. That is, a station having a geo-location database access capability in a white space band may broadcast a Gate Announcement frame in which a geo-location database access capability field of FIG. 5 is enabled (is set to 1).

Referring back to FIG. 2, upon being informed through a GANN action frame that a specific Mesh Gate supports geo-location database access, the MPs (STA2) which wish to join the mesh network acquire an available channel list through the Mesh Gate. In this embodiment, multi-hop communication between the MPs and the Mesh Gate is required. To this end, a multi-hop management action frame may be used. Consequently, a station which will join the mesh network, among the stations having received the Gate Announcement frame, may transmit a multi-hop management action frame functioning as a channel availability query request frame for acquiring available channel information to the corresponding MG as an MP (S220). The multi-hop management action frame transmitted as described above will be described.

FIG. 6 is a view showing an example of a format of a multi-hop management action frame for a channel availability query request according to an embodiment of the present invention.

The MPs which will join the mesh network, among the stations having received the Gate Announcement frame as previously described with reference to FIGS. 3 to 5, may transmit a multi-hop management action frame for a channel availability query request as shown in FIG. 6 to the Mesh Gate having transmitted the Gate Announcement frame (S220).

In FIG. 6, a Mesh Control field may include a target terminal address to which a channel availability query request frame is transmitted by multi-hop forwarding in a multi-hop wireless network. That is, in this embodiment, the Mesh Control field may indicate a Mesh Gate address supporting geo-location database access.

An FCC identifier field may indicate an FCC identifier allocated to a device operating in a white space band and a serial number field may indicate a serial number of a device allocated by a manufacturer. In addition, a Location Configuration Information (LCI) field indicates current location information. An LCI value may include information of latitude, longitude, altitude, and optionally azimuth.

In this embodiment, the Mesh Gate, receiving the multi-hop management action frame for the Channel Availability Query request as shown in FIG. 6, may acquire from a channel list available at the location based on the location information provided by the corresponding MP through the geo-location database access. The acquired available channel list may be transmitted to the corresponding MP again through the multi-hop management action frame as shown in FIG. 2 (S230). The multi-hop management action frame transmitted as described above will be described.

FIG. 7 is a view showing an example of a format of a multi-hop management action frame for a channel availability query response according to an embodiment of the present invention.

A mesh control field of the multi-hop management action frame as the channel availability query response frame shown in FIG. 7 may include a target terminal address to which the channel availability query response frame is transmitted by multi-hop forwarding in the multi-hop wireless network. Specifically, in this embodiment, the mesh control field may indicate an address of an MP requesting geo-location database access.

A White Space Map (WSM) is configured in the form of a MAP indicating whether a primary user occupies each TV channel of a TV White Space band in order to inform an STA of channel availability (primary user information) acquired through spectrum sensing and/or DB access. The WSM may have any format; however, an available channel number must be signaled. This channel number may be a TV Channel number or a WLAN channel number. The TV Channel number may be signaled.

In addition, an allowable maximum power value per channel may be indicated through the WSM. Since an available channel is changed based on time or place, the WSM may specify the length of a map to support a variable map length and specify a version of the map, from which whether the map has been updated can be confirmed. The WSM may update an available channel list or only some channels among an entire channel list.

A Mesh Gate having Geo-location database access capability may know location information of all MPs constituting the Mesh Network and an available channel list of the respective MPs. The Mesh Gate transmits the available channel list through the WSM. At this time, in one embodiment of the present invention, the Mesh Gate may select only a channel that can be commonly used by all of the MPs for response. This is provided to support effective channel switching of the MPs. Specifically, if the MP requests channel switching based on a channel list available at the location thereof, the MP may request switching to a channel list which is not available by the other MPs. In order to prevent this case, therefore, in one embodiment of the present invention, the Mesh Gate may select only a channel that can be commonly used by all of the MPs in the corresponding mesh network for response to Channel Availability Query.

If no commonly available channel is present, the Mesh Gate according to this embodiment may transmit a channel list that can be used only at the corresponding MP through the WSM. In other embodiment, if no commonly available channel is present, the Mesh Gate may configure a new mesh network or operate as a general AP.

FIG. 8 is a view showing an example of a format of a multi-hop management action frame for a channel availability query response having a plurality of WSMs according to an embodiment of the present invention.

Each individual WSM means an available channel list at the location of a specific MP. On the other hand, an MBSS WSM means a Mesh Basic Service Set (MBSS), i.e. a channel list that is commonly available in the Mesh Network.

In order to indicate a case in which there is no available channel, the WSM may include a length field. If the length field of the WSM is set to 0, no available channel information may be transmitted.

Hereinafter, a station apparatus used to configure the mesh network as described above will be described.

Figure 9:
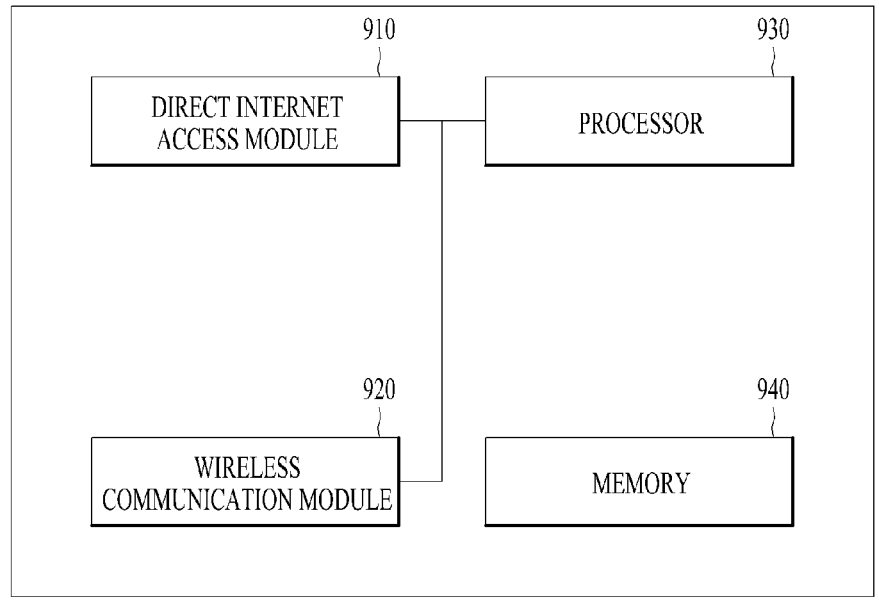
FIG. 9 is a view illustrating a concept of a station apparatus that can operate as a gate of a mesh network according to an embodiment of the present invention.

FIG. 9 is a view illustrating a concept of a station apparatus that can operate as a gate of a mesh network according to an embodiment of the present invention.

A station apparatus operating to configure a mesh network in a white space band according to an embodiment of the present invention includes a direct internet access module 910 for accessing a geo-location database and a wireless communication module 920 for transmitting and receiving a Gate Announcement Frame and/or a Multi-Hop Management Action Frame to and from another station through wireless communication. In addition, the station apparatus according to this embodiment may include a processor 930 for processing information and a memory 940 for storing information. Alternatively, the processor 930 and the memory 940 may be provided in the direct Internet access module 910 and/or the wireless communication module 920.

Specifically, the wireless communication module 920 according to this embodiment may inform one or more second stations that a first station including the direct Internet access module 910 can operate as a Mesh Gate through a Gate Announcement Frame, receive from one or more Mesh Points which will join the mesh network, among the one or more second stations, a first Multi-Hop Management Action Frame including location information of each of the one or more Mesh Points, and transmit a second Multi-Hop Management Action Frame including available channel information in the white space band to the one or more Mesh Points.

Figure 10:
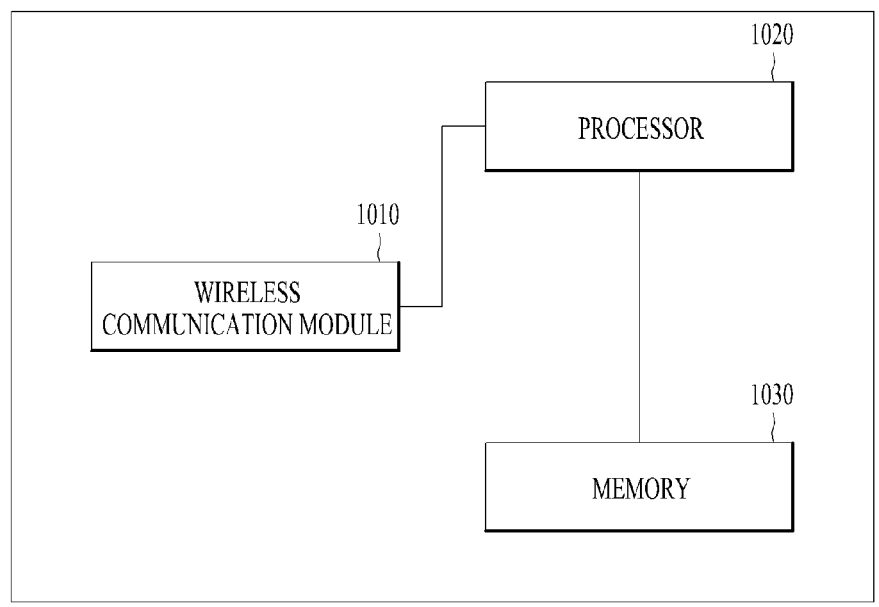
FIG. 10 is a view illustrating a concept of a station apparatus that can operate as a mesh point of a mesh network according to an embodiment of the present invention.

FIG. 10 is a view illustrating a concept of a station apparatus that can operate as a Mesh Point of a mesh network according to an embodiment of the present invention.

As compared with the station apparatus that can operate as a Mesh Gate as described above with reference to FIG. 9, a station apparatus operating as a Mesh Point may not include the direct Internet access module 910. As shown in FIG. 10, a station apparatus that can operate as a Mesh Point may include a wireless communication module 1010 for transmitting and receiving a Gate Announcement Frame and a Multi-Hop Management Action Frame, a processor 1020, and a memory 1030. Alternatively, the processor 1020 and the memory 1030 may be provided in the wireless communication module 1010.

Specifically, the wireless communication module 1010 of the station apparatus according to this embodiment may receive from a first station that can access a geo-location database through direct Internet access a Gate Announcement Frame indicating that the first station can operate as a Mesh Gate. In addition, upon determining that the processor 1020 will join the mesh network as a Mesh Point, the wireless communication module 1010 may transmit a first Multi-Hop Management Action Frame including location information of the station apparatus corresponding to the Mesh Point to the first station and receive a second Multi-Hop Management Action Frame including available channel information in the white space band from the first station.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

INDUSTRIAL APPLICABILITY

While various embodiments of the present invention as described above are applied to IEEE 802.11 systems, the embodiments of the present invention can be equally applied to various mobile communication systems in which a mesh network can be configured in a white space band.

The invention claimed is:
1. A method of configuring a Mesh Network in a white space band, the method comprising:
    informing, by a first station, second stations that the first station capable of accessing a geo-location database through direct Internet access is capable of operating as a Mesh Gate through a Gate Announcement Frame;
    receiving, by the first station, from Mesh Points intending to join the Mesh Network, among the second stations, a first Multi-Hop Management Action Frame comprising location information of each of the Mesh Points;
    acquiring an available channel list of each of the Mesh Points from the geo-location database based on the location information;

determining whether one or more common channels commonly available to all of the Mesh Points are present in the available channel list; and transmitting, by the first station, a second Multi-Hop Management Action Frame to the Mesh Points, wherein the second Multi-Hop Management Action Frame comprises:
- an individual White Space Map field related to the available channel list at the location of specific mesh point; and
- a Mesh Basic Service Set (MBSS) White Space Map field related to the one or more common channels commonly available to all of the Mesh Points, wherein, when the one or more common channels are present in the available channel list, the MBSS White Space Map field of the second Multi-Hop Management Action Frame comprises available channel information about the one or more common channels determined as commonly available to all of the Mesh Points, wherein, when there is no common channel commonly available to all of the Mesh Points in the available channel list, the individual White Space Map field of the second Multi-Hop Management Action Frame comprises available channel information about the available channel list of each of the Mesh Points, respectively, and the available channel list does not comprise the common channel, and wherein each of the individual White Space Map field and the MBSS White Space Map field respectively comprises a length field, and wherein the length fields of the individual White Space Map field and the MBSS White Space Map field are set to '0' when there is no available channel list.

2. The method according to claim 1, wherein at least one of the Mesh Points comprises a fixed device or a mode II device.

3. The method according to claim 1, wherein the Gate Announcement Frame comprises a frame enabling a field indicating that the first station has a geo-location database access capability.

4. The method according to claim 1, wherein the first Multi-Hop Management Action Frame comprises:
- a mesh control field comprising address information of the Mesh Gate;
- an FCC identifier field comprising an FCC identifier of the Mesh Points;
- a serial number field indicating a Serial Number allocated to a manufacturer of the Mesh Points; and
- a location configuration information field indicating location information of the Mesh Points.

5. The method according to claim 1, wherein the second Multi-Hop Management Action Frame comprises a mesh control field indicating an address of the Mesh Gate having transmitted the first Multi-Hop Management Action Frame.

* * * * *